United States Patent
Tabankin

[15] 3,672,269
[45] June 27, 1972

[54] SEQUENTIALLY OPERABLE HIDDEN CAMERA DEVICE

[72] Inventor: Phyllis Tabankin, 23 Taconic Road, Livingston, N.J. 07039

[22] Filed: April 8, 1970

[21] Appl. No.: 26,611

[52] U.S. Cl. ..................................95/11, 95/12, 346/107
[51] Int. Cl. .................................................G03b 29/00
[58] Field of Search ..............95/1, 11, 11.5, 12; 346/25, 346/107

[56] References Cited

UNITED STATES PATENTS

| | | |
|---|---|---|
| 2,349,355 | 5/1944 | Kepler ..................................95/11 X |
| 3,244,086 | 4/1966 | Craghead..................................95/11 |
| 3,011,416 | 12/1961 | Hammer.....................................95/11 |
| 1,749,090 | 3/1930 | Shelby......................................346/25 |
| 621,314 | 3/1899 | Barber.......................................95/11 |

Primary Examiner—John M. Horan
Attorney—Sommers and Sommers

[57] ABSTRACT

A sequentially operable hidden camera device, enclosing a camera therein with means to conceal the presence of the camera from the view of intruders, and which will trigger the camera by connection to an intruder detection system, to cause the camera to take a series of pictures of the intruder for identification purposes, and to deter the intruder by flashes connected with the operation thereof.

4 Claims, 4 Drawing Figures

INVENTOR.
PHYLLIS TABANKIN
BY
Sommers & Sommers
ATTORNEYS

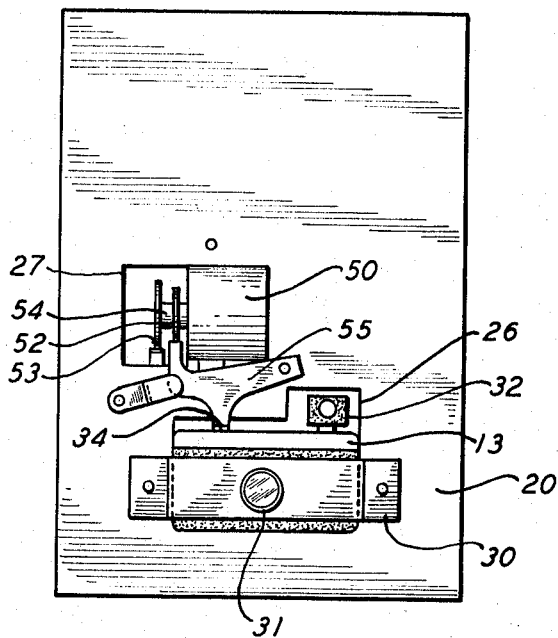
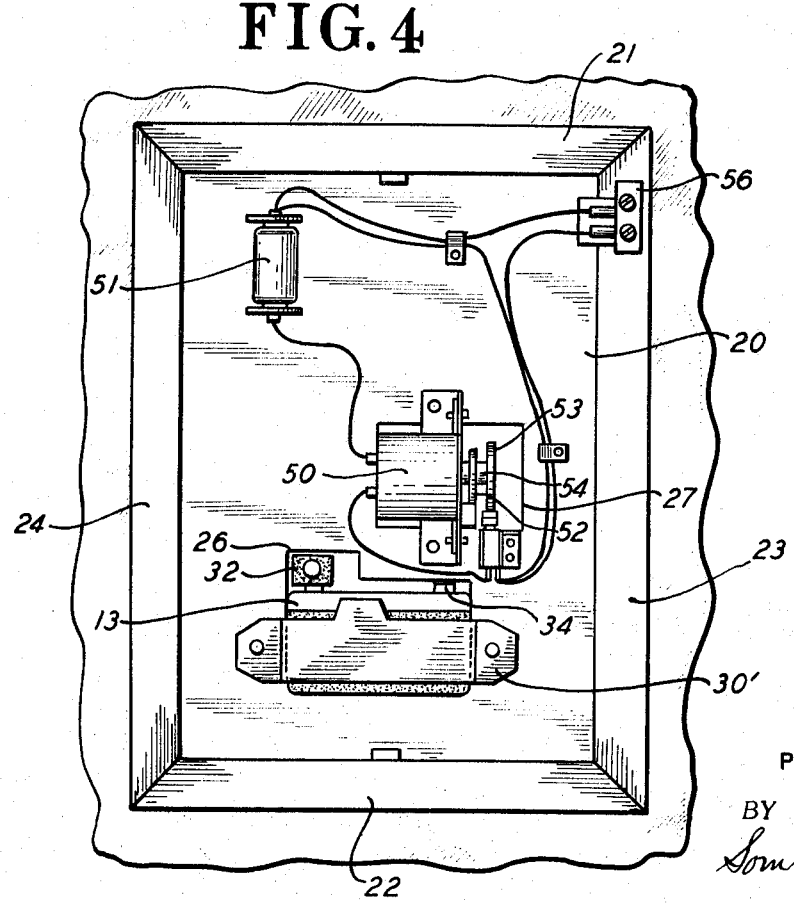

SEQUENTIALLY OPERABLE HIDDEN CAMERA DEVICE

BACKGROUND OF THE INVENTION

This invention relates generally to intrusion detection and prevention devices, and more specifically relates to a sequentially operable hidden camera device for the detection and recording of intruders, and for the prevention of intrusions by causing startling flash-sequence picture taking thereof.

SUMMARY OF THE INVENTION

Now in accordance with the present invention, the objects of the invention are achieved through use of a camera which is concealed in a frame behind a one-way or other disguised cover enabling pictures to be taken therethrough while preventing and concealing visibility of the camera from the outside of the device, and the device is interconnected to an intruder detection system whereby the camera is actuated to take a sequence of pictures of the intruder, and to cause startling flashes of light to prevent intrusions as desired by the operator.

BRIEF DESCRIPTION OF DRAWINGS

The invention is diagrammatically illustrated, by way of example, in the appended drawings, in which:

FIG. 3 is a front elevational view of the interior support member with the camera and actuation means mounted therein;

FIG. 4 is a rear elevational view of the interior support member in the frame with the camera and actuation means mounted therein.

DESCRIPTION OF PREFERRED EMBODIMENTS

Figure 1:
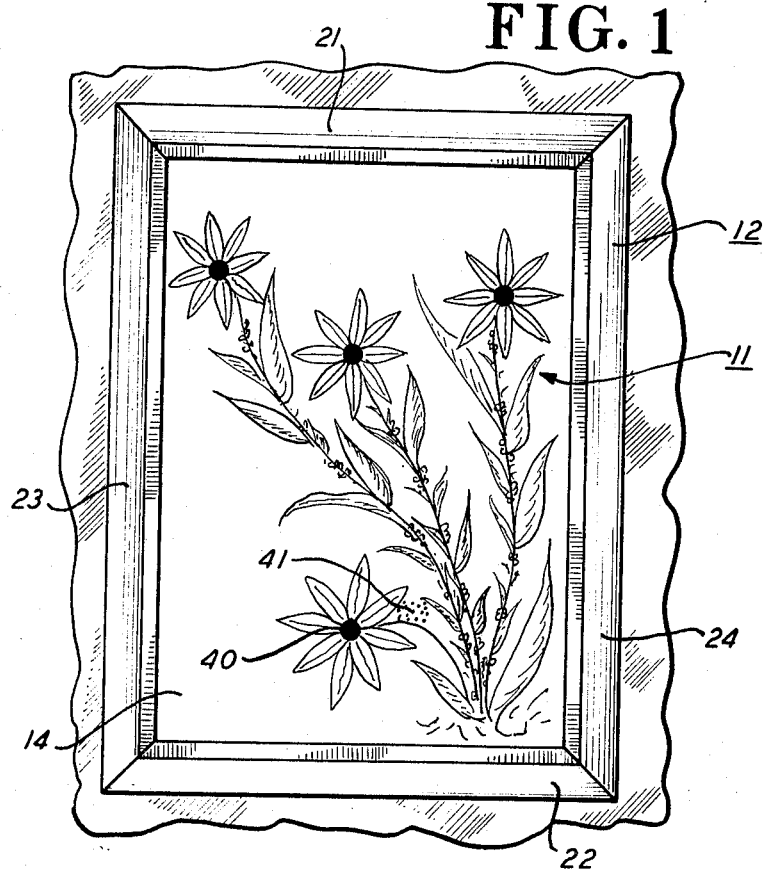
FIG. 1 is a front elevational view of the concealed sequentially operable hidden camera device, pursuant to the invention.

In accordance with the preferred mode of practicing the invention, the sequentially-operable hidden camera device 11 (FIG. 1) comprises a frame member 12, a camera 13 (FIG. 3), mounted therein, a cover member 14 (FIG. 1), and actuation means 15 (FIG. 2) which further interconnects said camera 13 with an intruder detection system (not shown).

Figure 2:
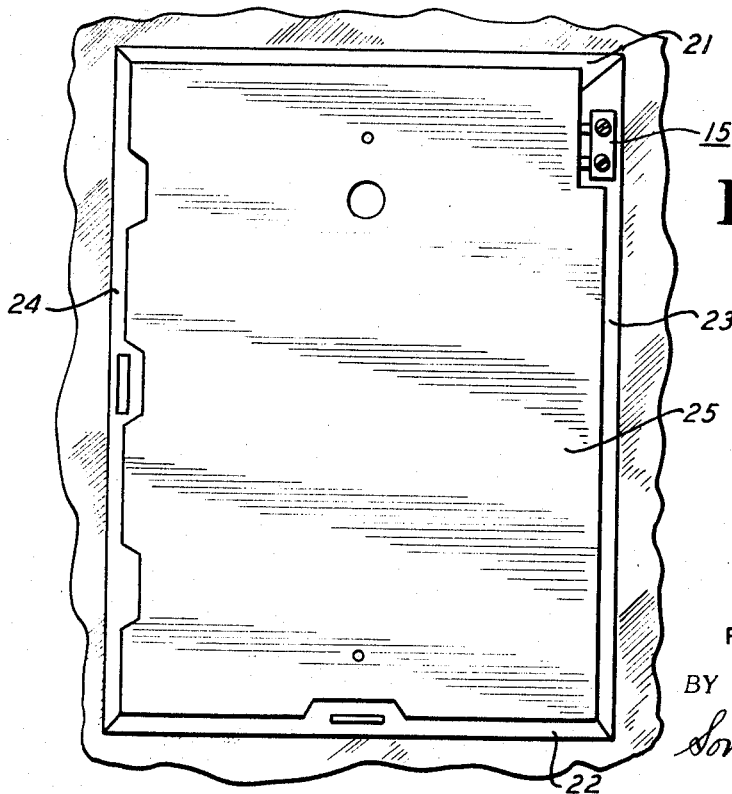
FIG. 2 is a rear elevational view of the frame and removable back cover of the invention.

The frame member 12, for example, may comprise an interior support member 20 (FIG. 4), a top rim 21, a bottom rim 22, side rims 23,24, and a back cover 25 (FIG. 2). The rim members 21,22,23 and 24 are affixed to each other to form the frame 12, and also support the cover member 14 in the forward portions thereof (FIG. 1). The interior support member 20 has camera aperture 26 and cam aperture 27 therein (FIGS. 3 and 4) to receive and to mount the camera and actuation means therein. The back cover member 25 (FIG. 2) is preferably slidably removable from the frame member to enable access to the apparatus mounted therein.

The camera 13 (FIGS. 3 and 4), for example, is mounted in the camera aperture 26 in interior support member 20 by mounting means 30 with an aperture 31 therein for the camera shutter, and comprises, for example, a standard commercial camera device which can be utilized with a flash bulb attachment 32 thereof with either a four-flash sequence or continuous flash embodiment as desired by the operator, actuated by shutter button 33 thereof.

The cover member 14 (FIG. 1), (for example, a pictorial representation as shown, with a camera aperture 26 or a one-way glass), enables the taking of pictures therethrough by the camera 13, while concealing viewing of the camera from in front of the device, shutter aperture 40 being concealed and disguised, with the exception that flashes of light (from the flash bulbs, for example) may be selectively visible therethrough through an appropriate concealed plurality of very small flash apertures 41 as desired.

Actuation means 15 comprises, for example (FIGS. 3 and 4) a motor 50, which can be operated by power source 51 a battery or AC power source as desired, for example, with timing cam 52 and operating cam 53 which determine the running time of shutter operation as desired, located on motor shaft 54, shutter actuator arm 55 to actuate the shutter of the camera by interaction with shutter button 34 to cause pictures to be taken, and switch connection 56 for interconnection of said actuation means 15 with an intruder detection system (not shown).

In operation, in a preferred embodiment of the device (FIG. 4), a signal of an intrusion (which may be time-delayed to enable the intruder to reach a particular position in the room prior to operation of the device) is relayed by an intrusion detection device (not shown, which could be interconnected with the sequentially operable hidden camera device by remote control, wire, or other similar system) to switch connection 56; the intrusion signal is then relayed to the power source 51 which actuates the motor 50, which in turn causes rotation of the motor shaft 54 and the timing cam 52 and operating cam 53 carried thereon, causing movement of shutter actuator arm 55 (FIG. 3) to depress the shutter button 33 and thereby actuate the camera shutter to sequentially operate the camera to take a series of pictures through the cover member 14 (FIG. 1).

The timing of the pictures to be taken is determined by the size and shape of the timing cam 52 and can be altered by changing same; the cam shape-determined pre-set movement of the timing cam 52 periodically actuates the shutter bottom 33 and the camera shutter in timed sequence as desired by the operator. The total running time of camera photographic recording is determined by the size and shape of operating cam 53, which can similarly be altered by changing same. The camera utilized in the device of this invention is preferably of the cartridge-load type, for ease of film removal and replacement, and compactness of operation, enabling useage of the device with minimal difficulty and with little training required for the operator; the camera may further comprise a four-flash cube or continuous flash pack for flash operation, and may comprise a moving picture camera with or without a voice track for continuous operation as desired. In the flash camera embodiment of the invention the flash would cause the intruder to turn in reflex action to face the flashing light in order to see what caused the flashes, thereby enabling pictures to be taken of his face; the intruder might furthermore by frightened away by the sudden startling flash of lights from the camera flash. The flash apertures 41 are preferably small in size and few in number to aid concealment and have been found to afford sufficient opening to enable flash light to project therethrough to facilitate picture taking. In places where flash operation or any sudden startling action might jeopardize lives, because the intruders might panic, (such as in banks during a holdup), the camera would preferably be installed without the flash attached thereto, and the camera's operation would be completely concealed from the intruders. Access to the camera supported in the interior support member 20 is obtained by removing the back cover member 25 thereof, in order to remove the camera, to replace the camera film or flash bulbs, or to repair or replace other elements in the device.

The device of this invention fits into the decor of a home, office, or other premises, and can be suitably framed as desired. The device can have a lock incorporated therein to prevent access by the intruder to the photographic recording elements therein, and can further be interconnected to an audio alarm system, such as a bell (which could be timed to go off after passage of sufficient time for the hidden camera to make its photographic record) which would cause the intruder to leave the premises for fear of detection rather than delay and attempt to break into the device to destroy the film.

While the present invention has been particularly set forth in terms of specific embodiments thereof, it will be evident in view of the instant disclosure, that numerous variations in propriety are yet within the true scope of this teaching. Accordingly, the invention is to be broadly construed, and limited only by the scope and spirit of the claims now appended hereto.

I claim:

1. Apparatus for concealing and sequentially operating a camera device for photographically recording an intrusion into an area, operable in conjunction with an intruder detection system, which comprises:
   a. a frame member, comprising a frame and an interior support member supported in the frame;
   b. a camera, mounted in the interior support member, for photographically recording the intrusion, including a shutter button, and an operating lens;
   c. a cover member, which is mounted in the front portion of the frame, and which covers the operating lens and conceals the camera from outside view; and
   d. means for actuating the camera, which are interconnected with the intruder detection system for timed actuation of the camera upon intrusion of the protected area by an intruder, which comprises switch connection means interconnecting with the intruder detection system to relay a signal of an intrusion, a motor with a motor shaft extending therefrom and carrying a timing cam and an operating cam thereon, a power source connected with the motor and the operating cam and connected to the switch connection means to be operable in connection with an intrusion signal, and a pivoted shutter actuator arm interconnecting the timing cam and shutter button of the camera, to cause sequential actuation of the shutter button and operation thereby of the camera shutter, the shutter actuator arm comprising a pivoted portion, a pivot pin extending through the pivot portion, a cam actuating portion in engagement with the timing cam, and a shutter portion in contact with the shutter button.

2. A concealing sequentially operating apparatus as recited in claim 1, in which the interior support member includes a camera aperture and a cam aperture therein, camera mounting means mounting the camera in the camera aperture, and motor mounting means mounting the motor on the interior support member with the timing cam and operating cam extending through the cam aperture for operation.

3. A concealing sequentially operating apparatus as recited in claim 2, further comprising a flash bulb attachment, connected directly to the camera, for the taking of flash pictures thereby.

4. A concealing sequentially operating apparatus as recited in claim 3, the cover member having flash apertures therein.

* * * * *